United States Patent
Munshi et al.

(10) Patent No.: US 8,806,513 B2
(45) Date of Patent: *Aug. 12, 2014

(54) APPLICATION PROGRAMMING INTERFACES FOR DATA PARALLEL COMPUTING ON MULTIPLE PROCESSORS

(71) Applicants: Aaftab A. Munshi, Los Gatos, CA (US); Nathaniel Begeman, San Jose, CA (US)

(72) Inventors: Aaftab A. Munshi, Los Gatos, CA (US); Nathaniel Begeman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/646,552

(22) Filed: Oct. 5, 2012

(65) Prior Publication Data

US 2013/0081066 A1    Mar. 28, 2013

Related U.S. Application Data

(63) Continuation of application No. 12/264,896, filed on Nov. 4, 2008, now Pat. No. 8,286,198.

(51) Int. Cl.
G06F 3/00 (2006.01)
G06F 9/46 (2006.01)
G06F 9/44 (2006.01)
G06F 9/45 (2006.01)

(52) U.S. Cl.
USPC ............ 719/328; 718/106; 717/119; 717/140

(58) Field of Classification Search
None
See application file for complete search history.

(56) References Cited

U.S. PATENT DOCUMENTS

| | | | |
|---|---|---|---|
| 5,784,630 A | 7/1998 | Saito et al. | |
| 6,970,206 B1 | 11/2005 | Swan et al. | |
| 7,015,913 B1 | 3/2006 | Lindholm et al. | |
| 7,353,369 B1 | 4/2008 | Coon et al. | |
| 7,788,468 B1 | 8/2010 | Nickolls et al. | |
| 7,861,060 B1 | 12/2010 | Nickolls et al. | |
| 8,286,172 B2 * | 10/2012 | Chakradhar et al. | 718/102 |
| 8,549,499 B1 * | 10/2013 | Ding et al. | 717/149 |
| 2003/0154284 A1 * | 8/2003 | Bernardin et al. | 709/226 |
| 2004/0024610 A1 * | 2/2004 | Fradkov et al. | 705/1 |
| 2006/0259487 A1 * | 11/2006 | Havens et al. | 707/9 |
| 2008/0134156 A1 * | 6/2008 | Osminer et al. | 717/140 |
| 2008/0162886 A1 * | 7/2008 | Saha et al. | 712/214 |
| 2008/0184211 A1 * | 7/2008 | Nickolls et al. | 717/140 |
| 2008/0201721 A1 | 8/2008 | Little et al. | |
| 2008/0256330 A1 * | 10/2008 | Wang et al. | 712/24 |

(Continued)

OTHER PUBLICATIONS

"Parallel Java: A Unified API for Shared Memory and CLuster Parallel Programming in 100% Java", Kaminsky, 2007, pp. 1-8.*

(Continued)

Primary Examiner — Tuan Dao
(74) Attorney, Agent, or Firm — Blakely, Sokoloff, Taylor & Zafman LLP

(57) ABSTRACT

A method and an apparatus for a parallel computing program calling APIs (application programming interfaces) in a host processor to perform a data processing task in parallel among compute units are described. The compute units are coupled to the host processor including central processing units (CPUs) and graphic processing units (GPUs). A program object corresponding to a source code for the data processing task is generated in a memory coupled to the host processor according to the API calls. Executable codes for the compute units are generated from the program object according to the API calls to be loaded for concurrent execution among the compute units to perform the data processing task.

24 Claims, 14 Drawing Sheets

(56) References Cited

U.S. PATENT DOCUMENTS

| | | |
|---|---|---|
| 2008/0256521 A1 | 10/2008 | O'Brien et al. |
| 2009/0089542 A1 | 4/2009 | Laine et al. |
| 2011/0035737 A1 | 2/2011 | Stefansson et al. |

OTHER PUBLICATIONS

"The Factory Pattern in API design: A Usability Evaluation", Ellis, 2007, pp. 1-10.*

"OpenMP Application Program Interface", 2008, pp. 1-326.*

PCT International Search Report and Written Opinion for PCT International Application No. PCT/US2009/041149, mailed Sep. 4, 2009, 12 pages.

PCT Search Report and Written Opinion for PCT/US2009/041152 mailed Jul. 29, 2009, 13 pages.

Halfhill, Tom R., "Parallel Processing for the X86—RapidMind Ports Its Multicore Development Platform to X86 CPUs" The Insider's Guide to Microprocessor Hardware, Microprocessor Report, Nov. 26, 2007, XP-002536569, pp. 1-7.

Halfhill, Tom R., "Number Crunching with GPUs—PeakStream's Math API Exploits Parallelism in Graphics Processors," The Insider's Guide to Microprocessor Hardware, Microprocessor Report, Oct. 2, 2006, XP-002536570, pp. 1-6.

Peakstream, "The Peakstream Platform: High Productivity Software Development for Multi-Core Processors," Mar. 5, 2007, XP-002502799, pp. 1-12.

Halfhill, Tom R., "Parallel Processing With CUDA—Nvidia's High-Performance Computing Platform Uses Massive Multithreading" The Insider's Guide to Microprocessor Hardware, Microprocessor Report, Jan. 28, 2008, XP-002536571, pp. 1-8.

Buck, I, et al., "Brook for GPUs: Stream Computing on Graphics Hardware", in ACM SIGGRAPH 2004 Papers (SIGGRAPH '04), Joe Marks (Ed.). ACM, New York, NY, USA, pp. 777-786.

Mark, W.R., et al., "Cg: A System for Programming Graphics Hardware in a C-Like Language", ACM Trans. Graph. 33, Jul. 3, 2003, pp. 896-907.

* cited by examiner

1000

```
const sampler_t sampler = { CL_ADDRESS_CLAMP_TO_EDGE,
                            CL_FILTER_NEAREST,
                            CL_FALSE
};
                    ╱─905                         ╱─901
__kernel void image_filter (int n, int m,
            __constant float *filter_weights,           ╱─903
            __global __rd image2d_t src_image,
            __global __wr image2d_t dst_image)
{
        int i, j;
        int indx = 0;
        int tid_x = get_global_thread_id(0);
        int tid_y = get_global_thread_id(1);
        float4 filter_result = make_float4(0.0f, 0.0f, 0.0f, 0.0f);
        for (i=-m/2; i<(m+1)/2; i++)
        {
                for (j=-n/2; j<(n+1)/2; j++)
                {
                        float w = filter_weights[indx++];
                        if (w != 0.0f)
                        {
                                filter_result += w * read_imagef(src_image, sampler,
                                make_int2(tid_x + j, tid_y + i));
                        }
                }
        }
        write_imagef(dst_image, make_int2(tid_x, tid_y), filter_result);
}
```

Fig. 10

```
1100A
void
delete_memobjs(cl_mem *memobjs, int n)
{
        int i;
        for (i=0; i<n; i++) clReleaseMemObject(memobjs[i]);
} int
exec_image_filter_kernel(int filter_w, int filter_h, const float *filter_weights const cl_image_format *image_format_desc,
                         const char *image_filter_src, void *src_image, void *dst_image);
{
        size_t args_size[] = { sizeof(int), sizeof(int), sizeof(cl_mem), sizeof(cl_mem), sizeof(cl_mem),
};
        void                    *args_value[5];
        int                     args_indices[5] = { 0, 1, 2, 3, 4 };
        int                     num_devices;
        cl_                     device device;
        cl_context              context;
        cl_program              program;
        cl_kernel               kernel;
        cl_mem                  memobjs[3];
        cl_event                events[3];
        cl_mem_flags            flags;
        cl_context_property     context_properties[3];
        int                     thread_dim[2];
        int                     err;

// get the GPU compute device and create a compute context
        clGetComputeDevices(CL_DEVICE_GPU, 1, &device, &num_devices);
        context_properties[0] = CL_CONTEXT_EXEC_MODE_ASYNC;
        context_properties[1] = true;
        context_properties[2] = NULL;
        context = clCreateContext(context_properties, device);
        if (context == (cl_context)0)   return -1;

// allocate the input and output image memory objects
        flags = CL_MEM_ALLOC_GLOBAL_POOL | CL_MEM_READ_ONLY;
        memobjs[0] = clCreateImage2D(device, flags,
        image_format_desc, w, h, NULL);
        if (images [0] == (cl_mem)0)
        {
                clReleaseContext(context);
                return -1;
        }
        flags = CL_MEM_ALLOC_GLOBAL_POOL | CL_MEM_WRITE_ONLY;
        memobjs[1] = clCreateImage2D(device, flags,
        image_format_desc, w, h, NULL);
        if (Images[1] == (cl_mem)0)
        {
                delete_memobjs(memobjs, 1);
                clReleaseContext(context);
                return -1;
        }

// load the input image
        err = clWriteImage(context, memobjs[0], true, 0, 0, 0, w, h, 1, NULL, src_image, &events[0]);
        if (err != CL_SUCCESS)
        {
                delete_memobjs(memobjs, 2);
                clReleaseContext(context);
                return -1;
        }
```

```
// allocate an array memory object to load the filter weights
        flags = CL_MEM_ALLOC_CONSTANT_POOL;
        memobjs[2] = clCreateArray (device, flags,
        sizeof(float), n * m, NULL);
        if (memobjs[2] == (cl_mem)0)
        {
                delete_memobjs(memobjs, 2);
                clReleaseContext(context);
                return -1;
        }

// load the filter weights into filter_array
        err = clWriteArray(context, memobjs[2], true, (n * m * sizeof(float)),
                        filter_weights, &events[1]);
        if (err != CL_SUCCESS)
        {
                delete_memobjs(memobjs, 3);
                clReleaseContext(context);
                return -1;
        }

// create the compute program
        program = clCreateProgram(device);
        if (program == (cl_program)0)
        {
                delete_memobjs(memobjs, 3);
                clReleaseContext(context);
                return -1;
        }

// load the compute program source
        err = clLoadProgramSource(program, 1, &image_filter_src, NULL);
        if (err != CL_SUCCESS)
        {
                delete_memobjs(memobjs, 3);
                clReleaseProgram(program);
                clReleaseContext(context);
                return -1;
        }

// build the compute kernel executable
        err = clBuildProgramExecutable(program, false, NULL, NULL);
        if (err != CL_SUCCESS)
        {
                delete_memobjs(memobjs, 3);
                clReleaseProgram(program);
                clReleaseContext(context);
                return -1;
        }

// create the compute kernel
        kernel = clCreateKernel(program, "image_filter");
        if (kernel == (cl_kernel)0)
        {
                delete_memobjs(memobjs, 3);
                clReleaseProgram(program);
                clReleaseContext(context);
                return -1;
        }
```

```
// create kernel args object and set arg values.
// set the args values
         args_value[0] = (void *)&filter_w;
         args_value[1] = (void *)&filter_h;
         args_value[2] = (void *)memobjs[2];
         args_value[3] = (void *)memobjs[0];
         args_value[4] = (void *)memobjs[1];
         err = clSetKernelArgs(context, kernel, 5, args_indices, args_value, args_size);
1113     if (err != CL_SUCCESS)
         {
                  delete_memobjs(memobjs, 3);
                  clReleaseKernel(kernel);
                  clReleaseProgram(program);
                  clReleaseContext(context);
                  return -1;
         }

// set thread dimensions
         thread_dim[0] = w; thread_dim[1] = h;

// execute kernel
1115  // make sure writes to images have completed
      // before executing kernel
         err = clExecuteKernel(context, kernel, NULL, thread_dim, NULL, 2, events, 2, events[2]);
         if (err != CL_SUCCESS)
         {
         delete_memobjs(memobjs, 3);
         clReleaseKernel(kernel);
         clReleaseProgram(program);
         clReleaseContext(context);
         return -1;
1117     }

// synchronous mode - wait for kernel execution to complete
         err = clGetEventStatus(events[2], CL_EVENT_WAIT_FOR_COMPLETION, NULL);
         if (err != CL_SUCCESS)
         {
                  delete_memobjs(memobjs, 3);
                  clReleaseKernel(kernel);
                  clReleaseProgram(program);
                  clReleaseContext(context);
                  return -1;
1119     }

// read output image
         err = clReadImage(context, memobjs[1], false, 0, 0, 0, w, h, 1, dst_image, NULL);
         if (err != CL_SUCCESS)
         {
                  delete_memobjs(memobjs, 3);
                  clReleaseKernel(kernel);
                  clReleaseProgram(program);
                  clReleaseContext(context);
                  return -1;
1121     }

// release kernel, program, and memory objects
         delete_memobjs(memobjs, 3);
         clReleaseKernel(kernel);
         clReleaseProgram(program);
         clReleaseContext(context);
         return 0; // success...
}
```

Fig. 11C

APPLICATION PROGRAMMING INTERFACES FOR DATA PARALLEL COMPUTING ON MULTIPLE PROCESSORS

CROSS-REFERENCE TO RELATED APPLICATIONS

This application is a continuation of U.S. application Ser. No. 12/264,896, filed on Nov. 4, 2008, now issued as U.S. Pat. No. 8,286,198, which is related to, and claims the benefits of, U.S. Provisional Patent Application No. 61/059,739, filed on Jun. 6, 2008 entitled "Application Programming Interfaces for Data Parallel Computing on Multiple Processors", Aaftab A. Munshi et al. which are hereby incorporated by reference herein in its entirety.

FIELD OF INVENTION

The present invention relates generally to data parallel computing. More particularly, this invention relates to application programming interfaces (APIs) for data parallel computing across both CPUs (Central Processing Units) and GPUs (Graphical Processing Units).

BACKGROUND

As GPUs continue to evolve into high performance parallel computing devices, more and more applications are written to perform data parallel computations in GPUs similar to general purpose computing devices. Today, these applications are designed to run on specific GPUs using vendor specific interfaces. Thus, these applications are not able to leverage processing resources of CPUs even when both GPUs and CPUs are available in a data processing system. Nor can processing resources be leveraged across GPUs from different vendors where such an application is running.

However, as more and more CPUs embrace multiple cores to perform data parallel computations, more and more processing tasks can be supported by either CPUs and/or GPUs whichever are available. Traditionally, GPUs and CPUs are configured through separate programming environments that are not compatible with each other. Most GPUs require dedicated programs that are vendor specific. As a result, it is very difficult for an application to leverage processing resources of both CPUs and GPUs, for example, leveraging processing resources of GPUs with data parallel computing capabilities together with multi-core CPUs.

Therefore, there is a need in modern data processing systems to overcome the above problems to allow an application to perform a task using any available processing resources, such as CPUs and one or more GPUs, capable of performing the task.

SUMMARY OF THE DESCRIPTION

An embodiment of the present invention includes methods and apparatuses for a parallel computing program calling APIs in a host processor to perform a data processing task in parallel among compute units including central processing units (CPUs) and graphic processing units (GPUs) coupled to the host processor. A program object corresponding to a source code for the data processing task is generated in a memory coupled to the host processor according to the API calls. Executable codes for the compute units are generated from the program object according to the API calls to be loaded for concurrent execution among the compute units to perform the data processing task.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 10 is sample source code illustrating an example of a compute kernel source for a compute kernel executable to be executed in a plurality of physical computing devices;

FIGS. 11A-11C include a sample source code illustrating an example to configure a logical computing device for executing one of a plurality of executables in a plurality of physical computing devices by calling APIs;

DETAILED DESCRIPTION

Figure 1:
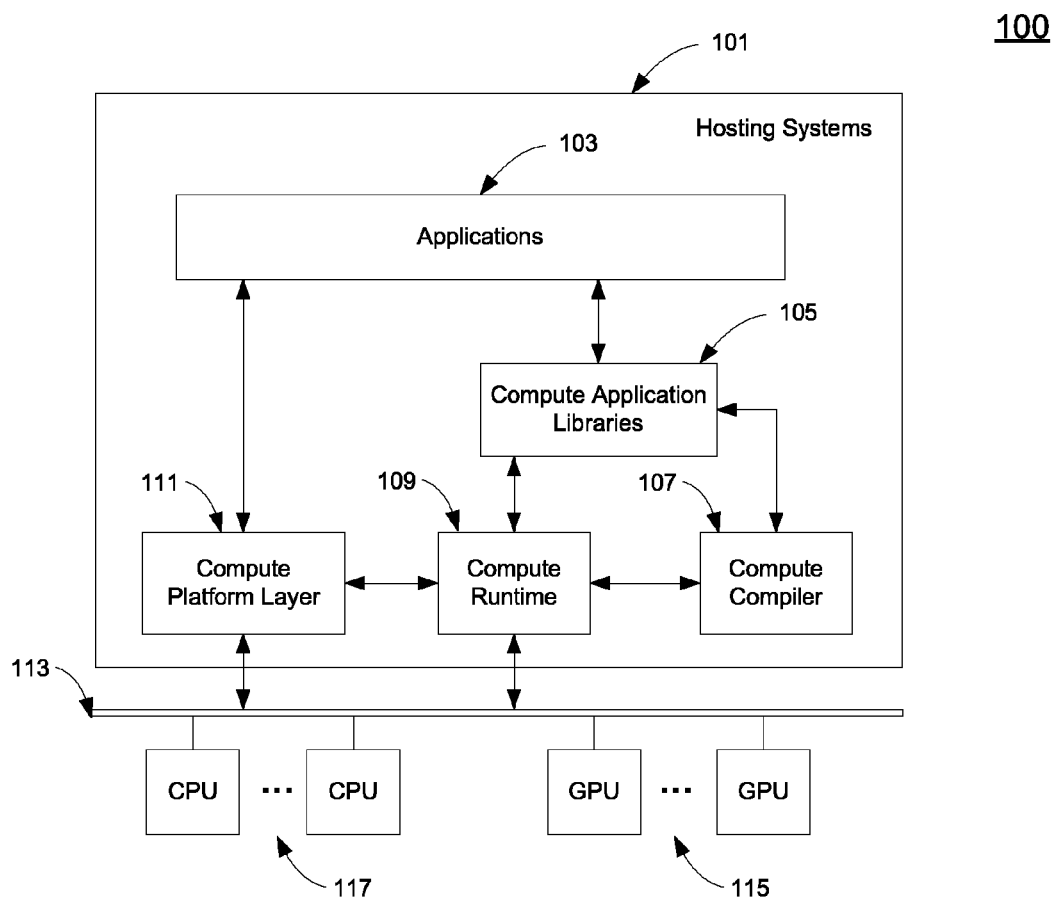
FIG. 1 is a block diagram illustrating one embodiment of a system to configure computing devices including CPUs and/or GPUs to perform data parallel computing for applications.

A method and an apparatus for data parallel computing on multiple processors are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

A Graphics Processing Unit (GPU) may be a dedicated graphics processor implementing highly efficient graphics operations, such as 2D, 3D graphics operation and/or digital video related functions. A GPU may include special (programmable) hardware to perform graphics operations, e.g. blitter operations, texture mapping, polygon rendering, pixel shading and vertex shading. GPUs are known to fetch data from a frame buffer and to blend pixels together to render an image back into the frame buffer for display. GPUs may also control the frame buffer and allow the frame buffer to be used to refresh a display, e.g. a CRT or LCD display, Either a CRT or an LCD display is a short persistence display that requires refresh at a rate of at least 20 Hz (e.g. every 1/30 of a second, the display is refreshed with data from a frame buffer). Usually, GPUs may take graphics processing tasks from CPUs coupled with the GPUs to output raster graphics images to display devices through display controllers. References in the specification to "GPU" may be a graphics processor or a programmable graphics processor as described in "Method and Apparatus for Multithreaded Processing of Data In a Programmable Graphics Processor", Lindholdm et al., U.S. Pat. No. 7,015,913, and "Method for Deinterlacing Interlaced Video by A Graphics Processor", Swan et al., U.S. Pat. No. 6,970,206, which are hereby incorporated by reference.

In one embodiment, a plurality of different types of processors, such as CPUs or GPUs may perform data parallel processing tasks for one or more applications concurrently to increase the usage efficiency of available processing resources in a data processing system. Processing resources of a data processing system may be based on a plurality of physical computing devices, such as CPUs or GPUs. A physical computing device may include one or more compute units. In one embodiment, data parallel processing tasks (or data parallel tasks) may be delegated to a plurality types of processors, for example, CPUs or GPUs capable of performing the tasks. A data parallel task may require certain specific processing capabilities from a processor. Processing capabilities may be, for example, dedicated texturing hardware support, double precision floating point arithmetic, dedicated local memory, stream data cache, or synchronization primitives. Separate types of processors may provide different yet overlapping groups of processing capabilities. For example, both CPU and GPU may be capable of performing double precision floating point computation. In one embodiment, an application is capable of leveraging either a CPU or a GPU, whichever is available, to perform a data parallel processing task.

In another embodiment, selecting and allocating a plurality of different types of processing resources for a data parallel processing task may be performed automatically during run time. An application may send a hint including desired list of capability requirements for a data processing task though an API to a runtime platform of a data processing system. In accordance with the hint received, the runtime platform may determine a plurality of currently available CPUs and/or GPUs with capabilities matching the received hint to delegate the data processing task for the application. In one embodiment, the list of capability requirements may depend on the underlying data processing task. A capability requirement list may be applicable across different groups of processors or compute units, including, for example, GPUs and multi-core CPUs from different vendors and of different versions. Consequently, an application may be insulated from providing programs targeting a particular type of compute unit, such as a CPU or GPU.

Furthermore, in another embodiment, allocating and grouping multiple threads to execute in parallel among selected compute units may be performed according to underlying problem space for a data parallel task. An analysis of representations for source codes to be executed in selected compute units may determine how a processing task should optimally be partitioned and distributed among the selected compute units. API interfaces may allow an application to specify how a data parallel task should be performed by executing an executable in groups of threads among selected compute units. In addition, an application may retrieve, using APIs, suggestions on an optimal partitioning of a data parallel task based on resource requirements for performing the task among selected compute units.

FIG. 1 is a block diagram illustrating one embodiment of a system 100 to configure computing devices including CPUs and/or GPUs to perform data parallel computing for applications. System 100 may implement a parallel computing architecture. In one embodiment, system 100 may be a graphics system including one or more host processors coupled with one or more central processors 117 and one or more other processors such as media processors 115 through a data bus 113. The plurality of host processors may be networked together in hosting systems 101. The plurality of central processors 117 may include multi-core CPUs from different vendors. A compute processor or compute unit, such as CPU or GPU, may be associated a group of capabilities. For example, a media processor may be a GPU with dedicated texture rendering hardware. Another media processor may be a GPU supporting both dedicated texture rendering hardware and double precision floating point arithmetic. Multiple GPUs may be connected together for Scalable Link Interface (SLI) or CrossFire configurations.

In one embodiment, the hosting systems 101 may support a software stack. The software stack can include software stack components such as applications 103, a compute platform layer 111, e.g. an OpenCL (Open Computing Language) platform, a compute runtime layer 109, a compute compiler 107 and compute application libraries 105. An application 103 may interface with other stack components through API calls. One or more threads may be running concurrently for the application 103 in the hosting systems 101. The compute platform layer 111 may maintain a data structure, or a computing device data structure, storing processing capabilities for each attached physical computing device. In one embodiment, an application may retrieve information about available processing resources of the hosting systems 101 through the compute platform layer 111. An application may select and specify capability requirements for performing a processing task through the compute platform layer 111. Accordingly, the compute platform layer 111 may determine a configuration for physical computing devices to allocate and initialize processing resources from the attached CPUs 117 and/or GPUs 115 for the processing task. In one embodiment, the compute platform layer 111 may generate one or more logical computing devices for the application corresponding to one or more actual physical computing devices configured.

The compute runtime layer 109 may manage the execution of a processing task according to the configured processing resources for an application 103, for example, based on one or more logical computing devices. In one embodiment, executing a processing task may include creating a compute program object representing the processing task and allocating memory resources, e.g. for holding executables, input/output data, etc. An executable loaded for a compute program object may be a compute program executable. A compute program executable may be included in a compute program object to be executed in a compute processor or a compute unit, such as a CPU or a GPU. The compute runtime layer 109 may interact with the allocated physical devices to carry out the actual execution of the processing task. In one embodiment, the compute runtime layer 109 may coordinate executing multiple processing tasks from different applications according to run time states of each processor, such as CPU or GPU configured for the processing tasks. The compute runtime layer 109 may select, based on the run time states, one or more processors from the physical computing devices configured to perform the processing tasks. Performing a processing task may include executing multiple threads of one or more executables in a plurality of physical computing devices concurrently. In one embodiment, the compute runtime layer 109 may track the status of each executed processing task by monitoring the run time execution status of each processor.

The runtime layer may load one or more executables as compute program executables corresponding to a processing task from the application 103. In one embodiment, the compute runtime layer 109 automatically loads additional executables required to perform a processing task from the compute application library 105. The compute runtime layer 109 may load both an executable and its corresponding source program for a compute program object from the application 103 or the compute application library 105. A source program for a compute program object may be a compute program source. A plurality of executables based on a single compute program source may be loaded according to a logical computing device configured to include multiple types and/or different versions of physical computing devices. In one embodiment, the compute runtime layer 109 may activate the compute compiler 107 to online compile a loaded source program into an executable optimized for a target processor, e.g. a CPU or a GPU, configured to execute the executable.

An online compiled executable may be stored for future invocation in addition to existing executables according to a corresponding source program. In addition, the executables may be compiled offline and loaded to the compute runtime 109 using API calls. The compute application library 105 and/or application 103 may load an associated executable in response to library API requests from an application. Newly compiled executables may be dynamically updated for the compute application library 105 or for the application 103. In one embodiment, the compute runtime 109 may replace an existing compute program executable in an application by a new executable online compiled through the compute compiler 107 for a newly upgraded version of computing device. The compute runtime 109 may insert a new executable online compiled to update the compute application library 105. In one embodiment, the compute runtime 109 may invoke the compute compiler 107 when loading an executable for a processing task. In another embodiment, the compute compiler 107 may be invoked offline to build executables for the compute application library 105. The compute compiler 107 may compile and link a compute kernel program to generate a compute program executable. In one embodiment, the compute application library 105 may include a plurality of functions to support, for example, development toolkits and/or image processing. Each library function may correspond to a compute program source and one or more compute program executables stored in the compute application library 105 for a plurality of physical computing devices.

Figure 2:
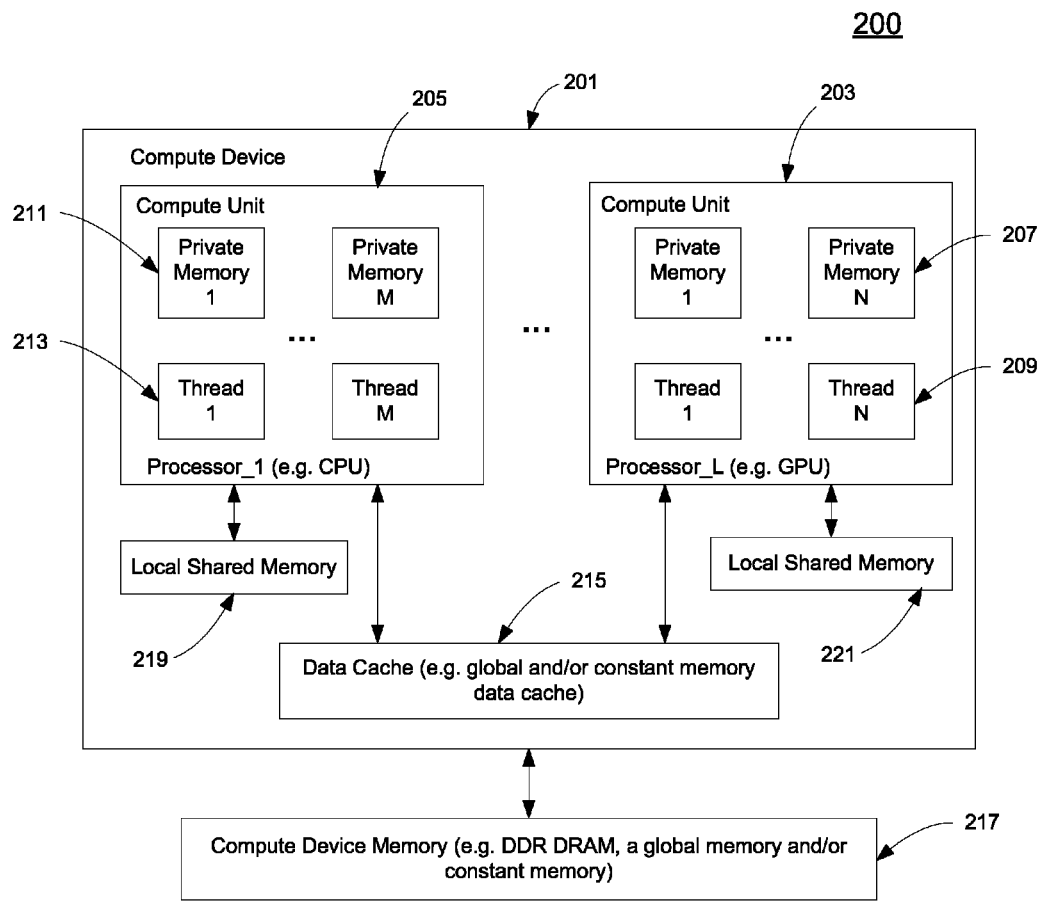
FIG. 2 is a block diagram illustrating an example of a computing device with multiple compute processors operating in parallel to execute multiple threads concurrently.

FIG. 2 is a block diagram illustrating an example of a computing device with multiple compute processors (e.g. compute units) operating in parallel to execute multiple threads concurrently. Each compute processor may execute a plurality of threads in parallel (or concurrently). Threads that can be executed in parallel in a compute processor or compute unit may be referred to as a thread group. A computing device could have multiple thread groups that can be executed in parallel. For example, M threads are shown to execute as a thread group in computing device 205. Multiple thread groups, e.g. thread 1 of compute processor_1 205 and thread N of compute processor_L 203, may execute in parallel across separate compute processors on one computing device or across multiple computing devices. A plurality of thread groups across multiple compute processors may execute a compute program executable in parallel. More than one compute processors may be based on a single chip, such as an ASIC (Application Specific Integrated Circuit) device. In one embodiment, multiple threads from an application may be executed concurrently in more than one compute processors across multiple chips.

A computing device may include one or more compute processors or compute units such as Processor_1 205 and Processor_L 203. A local memory may be coupled with a compute processor. Local memory, shared among threads in a single thread group running in a compute processor, may be supported by the local memory coupled with the compute processor. Multiple threads from across different thread groups, such as thread 1 213 and thread N 209, may share a compute memory object, such as a stream, stored in a computing device memory 217 coupled to the computing device 201. A computing device memory 217 may include a global memory and a constant memory. A global memory may be used to allocate compute memory objects, such as streams. A compute memory object may include a collection of data elements that can be operated on by a compute program executable. A compute memory object may represent an image, a texture, a frame-buffer, an array of a scalar data type, an array of a user-defined structure, or a variable, etc. A constant memory may be read-only memory storing constant variables frequently used by a compute program executable.

In one embodiment, a local memory for a compute processor or compute unit may be used to allocate variables shared by all threads in a thread group or a thread group. A local memory may be implemented as a dedicated local storage, such as local shared memory 219 for Processor_1 and local shared memory 221 for Processor_L. In another embodiment, a local memory for a compute processor may be implemented as a read-write cache for a computing device memory for one or more compute processors of a computing device, such as data cache 215 for compute processors 205, 203 in the computing device 201. A dedicated local storage may not be shared by threads across different thread groups. If the local memory of a compute processor, such as Processor_1 205 is implemented as a read-write cache, e.g. data cache 215, a variable declared to be in the local memory may be allocated from the computing device memory 217 and cached in the read-write cache, e.g. data cache 215, that implements the local memory. Threads within a thread group may share local variables allocated in the computing device memory 217 when, for example, neither a read-write cache nor dedicated local storage are available for the corresponding computing device. In one embodiment, each thread is associated with a private memory to store thread private variables that are used by functions called in the thread. For example, private memory 1 211 may not be seen by threads other than thread 1 213.

Figure 3:
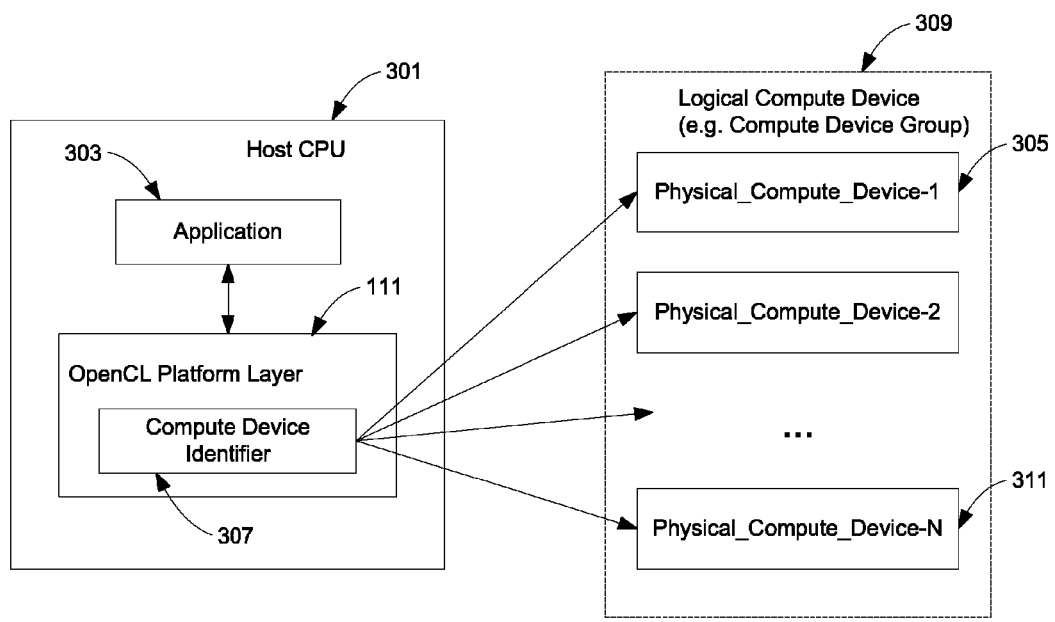
FIG. 3 is a block diagram illustrating one embodiment of a plurality of physical computing devices configured as a logical computing device using a computing device identifier.

FIG. 3 is a block diagram illustrating one embodiment of a plurality of physical computing devices configured as a logical computing device using a computing device identifier. In one embodiment, an application 303 and a platform layer 111 may be running in a host CPU 301. The application 303 may be one of the applications 103 of FIG. 1. Hosting systems 101 may include the host CPU 301. Each of the physical computing devices Physical_Compute_Device-1 305 through Physical_Compute_Device-N 311 may be one of the CPUs 117 or GPUs 115 of FIG. 1. In one embodiment, the compute platform layer 111 may generate a computing device identifier 307 in response to API requests from the application 303 for configuring data parallel processing resources according to a list of capability requirements included in the API requests. The computing device identifier 307 may refer to a selection of actual physical computing devices Physical_Compute_Device-1 305 through Physical_Compute_Device-N 311 according to the configuration by the compute platform layer 111. In one embodiment, a logical computing device 309 may represent the group of selected actual physical computing devices separate from the host CPU 301.

Figure 4:
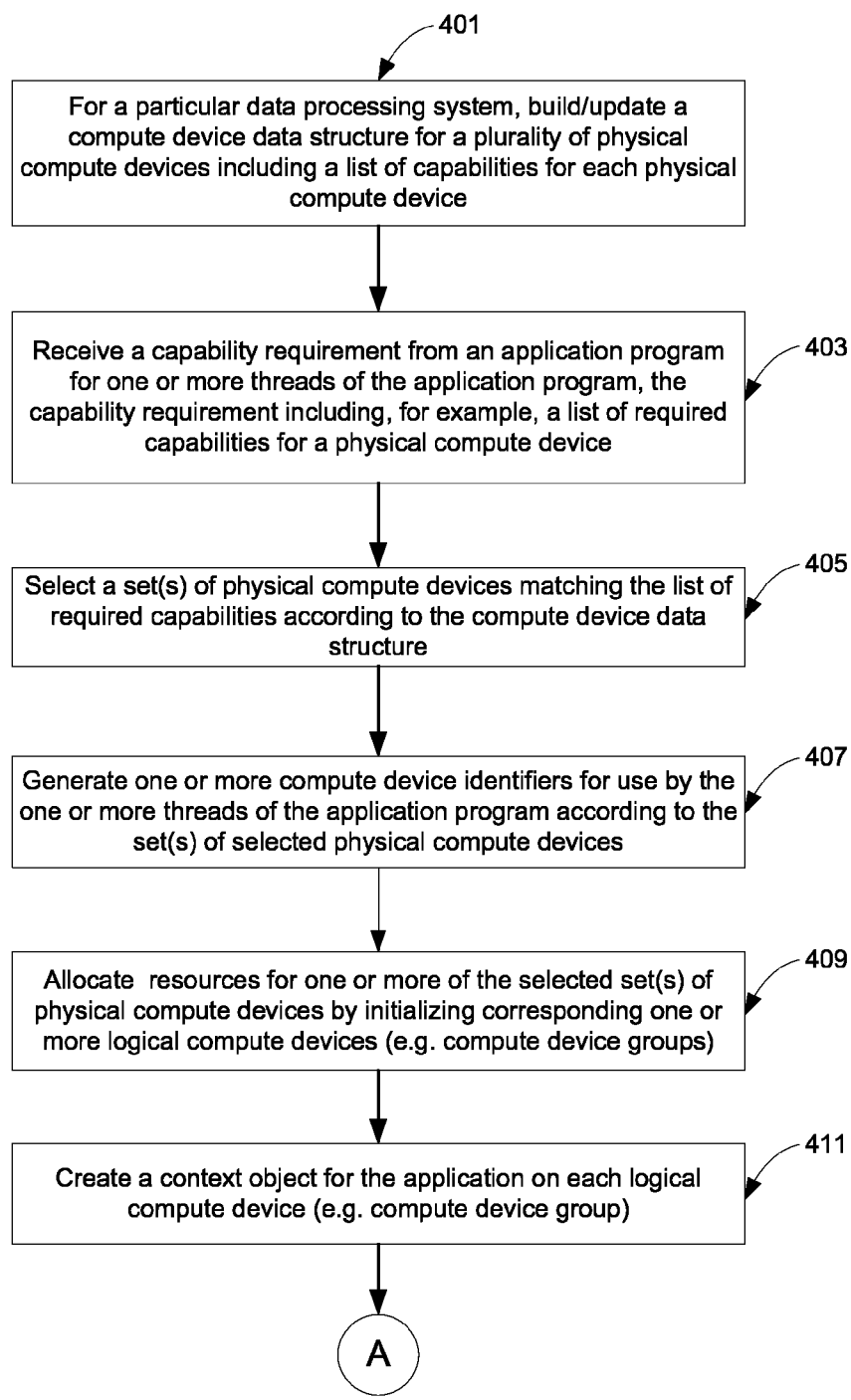
FIG. 4 is a flow diagram illustrating an embodiment of a process to configure a plurality of physical computing devices with a computing device identifier by matching a capability requirement received from an application.

FIG. 4 is a flow diagram illustrating an embodiment of a process 400 to configure a plurality of physical computing devices with a compute device identifier by matching a capability requirement received from an application. Exemplary process 400 may be performed by a processing logic that may comprise hardware (circuitry, dedicated logic, etc.), software (such as is run on a dedicated machine), or a combination of both. For example, process 400 may be performed in accordance with the system 100 of FIG. 1 in a data processing system hosted by the hosting systems 101. The data processing system may include a host processor hosting a platform layer, such as compute platform layer 111 of FIG. 1, and multiple physical computing devices attached to the host processor, such as CPUs 117 and GPUs 115 of FIG. 1.

At block 401, in one embodiment, the processing logic of process 400 may build a data structure (or a computing device data structure) representing multiple physical computing devices associated with one or more corresponding capabilities. Each physical computing device may be attached to the processing system performing the processing logic of process 400. Capabilities or compute capabilities of a physical computing device, such as CPU or GPU, may include whether the physical computing device supports a processing feature, a memory accessing mechanism, a named extension or associated limitations. A processing feature may be related to dedicated texturing hardware support, double precision floating point arithmetic or synchronization support (e.g. mutex).

Capabilities of a computing device may include a type indicating processing characteristics or limitations associated with a computing device. An application may specify a type of required computing device or query the type of a specific computing device using APIs. Examples of different types of computing devices are shown in the following table:

TABLE 1

| cl_device_type | Description |
| --- | --- |
| CL_DEVICE_TYPE_CPU | A single or multi-core CPU computing device may act as the host processor. The host CPU may host the application and OpenCL runtime. |
| CL_DEVICE_TYPE_GPU | A computing device that may also be used as a GPU, for example, to accelerate a 3D API such as OpenGL or DirectX. |
| CL_DEVICE_TYPE_ACCELERATOR | Dedicated compute accelerators other than CPUs or GPUs such as DSPs (digital signal processors), DAXPY (double precision a times x plus y) accelerators etc. |
| CL_DEVICE_TYPE_ALL | All computing devices available in the system. |

Additionally, capabilities of a computing device may include, for example, configuration values as shown in the following table:

TABLE 2

| cl_device_config_info | Description |
| --- | --- |
| CL_DEVICE_TYPE | Computing device type. Currently supported values are: CL_DEVICE_TYPE_CPU, CL_DEVICE_TYPE_GPU, CL_DEVICE_TYPE_ACCELERATOR, or a combination of the above. |
| CL_DEVICE_MAX_COMPUTE_UNITS | The number of parallel compute units on the computing device. The minimum value is one. |
| CL_DEVICE_MAX_THREAD_DIMENSIONS | Maximum dimensions that specify the global and local thread IDs. The minimum value is 3. |
| CL_DEVICE_MAX_GLOBAL_THREAD_SIZE | Max number of global threads that can be specified. |
| CL_DEVICE_MAX_THREAD_GROUP_SIZE | Max number of threads in a thread group |
| CL_DEVICE_SIMD_THREAD_GROUP_SIZE | Each thread group may be split into a SIMD group of threads. The number of threads in this SIMD group is given by this token. The threads in each SIMD group are executed in a SIMD fashion. |

TABLE 2-continued

| cl_device_config_info | Description |
|---|---|
| | If the size of the SIMD group is n, then the first n threads of the thread group will be executed by SIMD group 0, the next n threads will be executed by SIMD group 1 etc . . . |
| CL_DEVICE_CLOCK_FREQUENCY | Computing device clock frequency in MHz. |
| CL_DEVICE_ADDRESS_SPACE_BITS | Computing device address space size specified as an unsigned integer value in bits, for example, 32 or 64 bits. |
| CL_DEVICE_MAX_READ_IMAGE_ARGS | Max number of simultaneous image memory objects that can be read by a compute kernel. |
| CL_DEVICE_MAX_WRITE_IMAGE_ARGS1 | Max number of simultaneous image memory objects that can be written to by a compute kernel. The minimum value is 0 if the computing device does not support formatted image writes. If formatted image writes are supported, the minimum value is 8. |
| CL_DEVICE_MAX_MEM_ALLOC_SIZE | Max size of memory object allocation in bytes. The minimum value is max (¼th of CL_DEVICE_GLOBAL_MEM_SIZE, 128*1024*1024) |
| CL_DEVICE_IMAGE2D_MAX_WIDTH | Max width of 2D image in pixels. The minimum value is 8192. |
| CL_DEVICE_IMAGE3D_MAX_WIDTH | Max width of 3D image in pixels. The minimum value is 1024. |
| CL_DEVICE_IMAGE3D_MAX_HEIGHT | Max height of 3D image in pixels. The minimum value is 1024. |
| CL_DEVICE_IMAGE3D_MAX_DEPTH | Max depth of 3D image in pixels. The minimum value is 1024 |
| CL_DEVICE_MAX_SAMPLERS | Maximum number of samplers that can be used in a compute kernel. A minimum value may be 16. A sampler may include address mode, filter mode and normalized coordinates for a multi-dimensional object. |
| CL_DEVICE_MAX_SAMPLERS | Maximum number of samplers that can be used in a compute kernel. A minimum value may be 16 |
| CL_DEVICE_MEM_BASE_ADDR_ALIGN | Describes the alignment in bits for the base address of any allocated memory object. |
| CL_DEVICE_IMAGE_PITCH_ALIGN | Describes pitch alignment requirements in bits for an image memory object. |
| CL_DEVICE_IMAGE_MIN_PITCH_SIZE | This is the smallest pitch size in bytes allowed for any image memory object. |
| CL_DEVICE_SINGLE_FP_CONFIG | Describes single precision floating point capability of the computing device. This is a bit-field that describes one or more of the following values: CL_FP_DENORM—denorms are supported CL_FP_INF_NAN—INF and NaNs are supported. CL_FP_ROUND_TO_NEAREST—nearest rounding mode supported CL_FP_ROUND_TO_ZERO—round to zero rounding mode supported CL_FP_ROUND_TO_INF—round to +ve and −ve infinity rounding modes supported CL_FP_FMA—IEEE754r fused multiply-add is supported The mandated minimum floating point capability may include: CL_FP_ROUND_TO_NEAREST\| CL_FP_INF_NAN. |
| CL_DEVICE_GLOBAL_MEM_CACHE_TYPE | Type of global memory cache supported, such as CL_NONE, CL_READ and CL_READ_WRITE. |
| CL_DEVICE_GLOBAL_MEM_CACHE_LINE_SIZE | Size of global memory cache line in bytes. |
| CL_DEVICE_GLOBAL_MEM_CACHE_SIZE | Size of global memory cache in bytes. |
| CL_DEVICE_GLOBAL_MEM_SIZE | Size of global device memory in bytes. |

TABLE 2-continued

| cl_device_config_info | Description |
| --- | --- |
| CL_DEVICE_GLOBAL_GART_MEM_SIZE | Size of host accessible (PCIe) memory in bytes. |
| CL_DEVICE_CONSTANT_MEM_SIZE | Size of constant memory arena in bytes. |
| CL_DEVICE_LOCAL_MEM_TYPE | The type of local memory that is available. For example, a CL_LOCAL value may imply dedicated local memory storage such as SRAM, or CL_GLOBAL. |
| CL_DEVICE_LOCAL_MEM_SIZE | Size of local memory arena in bytes. |
| CL_DEVICE_PROFILING_TIMER_RESOLUTION | Describes the resolution of computing device timer. This is measured in nanoseconds. |
| CL_DEVICE_EXTENSIONS | A string describing optional features supported, such as 64 bit floating point arithmetic operations, 64 bit integer arithmetic operations, 3D image writes, complex numbers, local atomics, etc. |

A memory accessing mechanism for a physical processing device may be related to a type of variable cache (e.g., no support, read-only, or read-write), a type of compute memory object cache, size of cache support, a dedicated local memory support or associated limitations. Memory accessing limitations may include a maximum number of compute memory objects that can be simultaneously read or written by a compute program executable, a maximum number of compute memory objects that can be allocated, or a maximum size along a dimension of a multi-dimensional compute memory object, for example, a maximum width of a compute memory object for a 2D (two-dimensional) image. A system application of the data processing system may update the data structure in response to attaching a new physical computing device to a data processing system. In one embodiment, the capabilities of a physical computing device may be predetermined. In another embodiment, a system application of the data processing system may discover a newly attached physical processing device during run time. The system application may retrieve the capabilities of the newly discovered physical computing device to update the data structure representing the attached physical computing devices and their corresponding capabilities.

According to one embodiment, the processing logic of process 400 may receive a compute capability requirement from an application at block 403. The application may send the compute capability requirement to a system application by calling APIs. The system application may correspond to a platform layer of a software stack in a hosting system for the application. In one embodiment, a compute capability requirement may identify a list of required capabilities for requesting processing resources to perform a task for the application. In one embodiment, the application may require the requested processing resources to perform the task in multiple threads concurrently. In response, the processing logic of process 400 may select a group of physical computing devices from attached physical computing devices at block 405. The selection may be determined based on a matching between the compute capability requirement against the compute capabilities stored in the capability data structure. In one embodiment, the processing logic of process 400 may perform the matching according to a hint provided by the capability requirement.

The processing logic of process 400 may determine a matching score according to the number of compute capabilities matched between a physical computing device and the compute capability requirement. In one embodiment, the processing logic of process 400 may select multiple physical computing devices with highest matching scores. In another embodiment, the processing logic of process 400 may select a physical computing device if each capability in the capability requirement is matched. The processing logic of process 400 may determine multiple groups of matching physical computing devices at block 405. In one embodiment, each group of matching physical computing devices are selected according to a load balancing capability of each device. At block 407, in one embodiment, the processing logic of process 400 may generate a computing device identifier for each group of physical computing devices selected at block 405. The processing logic of process 400 may return one or more of the generated computing device identifiers back to the application through the calling APIs. An application may choose which processing resources to employ for performing a task according to the computing device identifiers. In one embodiment, the processing logic of process 400 may generate at most one computing device identifier at block 407 for each capability requirement received.

At block 409, in one embodiment, the processing logic of process 400 may allocate resources to initialize a logical computing device for a group of physical computing devices selected at block 405 according to a corresponding computing device identifier. A logical computing device may be a computing device group including one or more physical computing devices. The processing logic of process 400 may perform initializing a logical computing device in response to API requests from an application which has received one or more computing device identifiers according to the selection at block 405. The processing logic of process 400 may create a context object on the logical computing device for an application. Commands that operate on compute memory objects, compute program objects and/or compute program executables for a context object may be executed in-order (e.g. synchronously) or out of order (e.g. asynchronously) according to parameters specified in API requests when creating the context object. Profiling commands that operate on compute memory objects, compute programs or compute kernels may be enabled for a context object using API requests. In one embodiment, a context object is associated with one application thread in a hosting system running the application. Multiple threads performing processing tasks in one logical computing device or across different logical computing devices concurrently may be based on separate context objects.

In one embodiment, the processing logic of process 400 may be based on multiple APIs including clCreateContext, clRetainContext and clReleaseContext. The API clCreateContext creates a compute context. A compute context may correspond to a compute context object. The API clRetainContext increments the number of instances using a particular compute context identified by a context as an input argument to clRetainContext. The API clCreateContext does an implicit retain. This is very helpful for third-party libraries, which typically get a context passed to them by the application. However, it is possible that the application may delete the context without informing the library. Allowing multiple instances to attach to a context and release from a context solves the problem of a compute context being used by a library no longer being valid. If an input argument to clRetainContext does not correspond to a valid compute context object, clRetainContext returns CU_INVALID_CONTEXT. The API clReleaseContext releases an instance from a valid compute context. If an input argument to clReleaseContext does not correspond to a valid compute context object, clReleaseContext returns CU_INVALID_CONTEXT.

Figure 5:
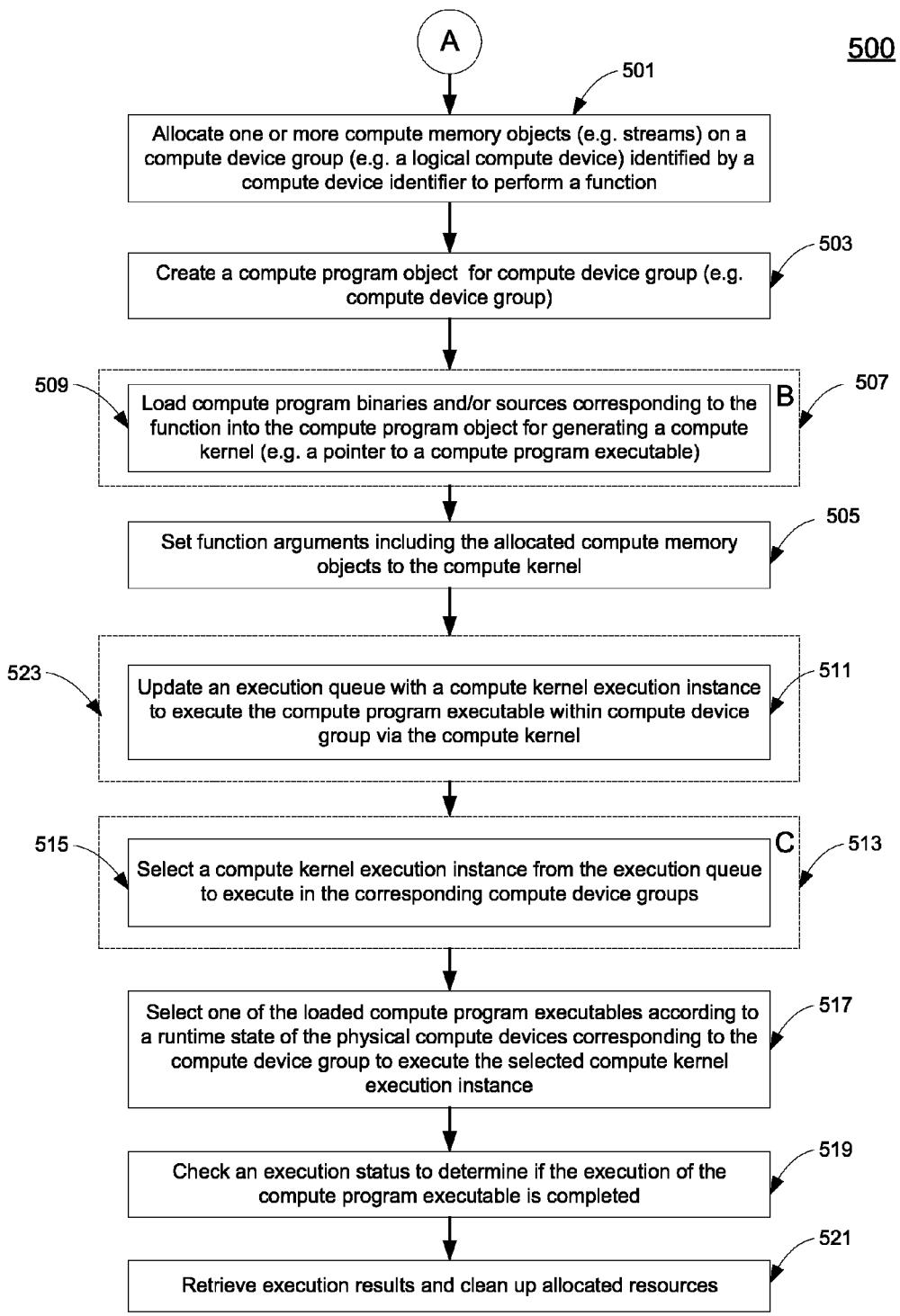
FIG. 5 is a flow diagram illustrating an embodiment of a process to execute a compute executable in a logical computing device.

FIG. 5 is a flow diagram illustrating an embodiment of an example process 500 to execute a compute executable in a logical computing device. In one embodiment, process 500 may be performed by a runtime layer in a data processing system such as the compute runtime layer 109 of FIG. 1. At block 501, the processing logic of process 500 may allocate one or more compute memory objects (e.g. streams) in a logical computing device to execute a compute executable. A compute memory object may include one or more data elements to represent, for example, an image memory object or an array memory object. An array memory object may be a one-dimensional collection of data element. An image memory object may be a collection to store two-dimensional, three-dimensional or other multi-dimensional data, such as a texture, a frame buffer or an image. A processing task may be performed by a compute program executable operating on compute memory objects or streams using compute memory APIs including reading from input compute memory objects and writing to output compute memory objects. In one embodiment, a compute memory object may be attached to a data object, such as a buffer object, texture object or a render buffer object, for updating the data object using compute memory APIs. A data object may be associated with APIs that activate graphics data processing operations, such as text rendering, on the data object.

When allocating a compute memory object, the processing logic of process 500 may determine where the allocation should reside according to specifications in an API. For example, a compute memory object may be allocated out of a host memory, such as a host memory for the hosting systems 101 of FIG. 1 and/or a computing device memory, such as a global memory or a constant memory 217 of FIG. 2. A compute memory object allocated in a host memory may need to be cached in a computing device memory. The processing logic of process 500 may asynchronously load data into allocated compute memory objects using non blocking API interfaces, e.g. based on generated event objects which include synchronization data indicating whether data has been loaded into a compute memory object. In one embodiment, the processing logic of process 500 may schedule memory access operations when reading from or writing to allocated compute memory objects. The processing logic of process 500 may map an allocated stream memory to form a logical address of an application. In one embodiment, the processing logic of process 500 may perform operations at block 501 based on API requests from an application running in a host processor, such as applications 103 of FIG. 1.

At block 503, according to one embodiment, the processing logic of process 500 may create a compute program object for the logical computing device (e.g. a computing device group). A compute program object may include a group of compute kernels representing exported functions or entry points of a data parallel program. A compute kernel may include a pointer to a compute program executable that can be executed on a compute unit to perform a data parallel task (e.g. a function). Each compute kernel may be associated with a group of function arguments including compute memory objects or streams allocated for function inputs or outputs, such as the streams allocated at block 501.

The processing logic of process 500 may load a compute program binary and/or a compute program source into the compute program object at block 509. A compute program binary may include bits that describe a compute program executable that will be run on a computing device. A compute program binary may be a compute program executable and/or an intermediate representation of a compute program source to be converted into a compute program executable. In one embodiment, a compute program executable may include description data associated with, for example, the type of target physical computing devices (e.g. a GPU or a CPU), versions, and/or compilation options or flags, such as a thread group sizes and/or thread group dimensions. A compute program source may be the source code where a compute program executable is compiled from. The processing logic of process 500 may load multiple compute program executables corresponding to a compute program source at block 509. In one embodiment, the processing logic of process 500 may load a compute program executable from an application or through a compute library such as compute application library 105 of FIG. 1. A compute program executable may be loaded with the corresponding compute program source. The processing logic of process 500 may set up function arguments for a compute program object at block 505. In one embodiment, the processing logic of process 500 may perform operations at blocks 503, 505 and 509 according to API requests from an application.

At block 511, the processing logic of process 500 may update an execution queue to execute the compute kernel object with a logical computing device. The processing logic of process 500 may execute a computer kernel in response to API calls with appropriate arguments to a compute runtime, e.g. compute runtime 109 of FIG. 1, from an application or a compute application library, such as applications 103 or compute application library 105 of FIG. 1. Executing a compute kernel may include executing a compute program executable associated with the compute kernel. In one embodiment, the processing logic of process 500 may generate a compute kernel execution instance to execute a compute kernel. API calls to a compute runtime, such as compute runtime 109 of FIG. 1, to execute a compute kernel may be asynchronous in nature. An execution instance may be identified by a compute event object that may be returned by a compute runtime, such as compute runtime 109 of FIG. 1. A compute kernel execution instance may be added to an execution queue to execute a compute kernel instance.

In one embodiment, API calls to a compute runtime to execute a compute kernel may include the number of threads that execute simultaneously in parallel on a compute processor as a thread group. An API call may include the number of compute processors to use. A compute kernel execution instance may include a priority value indicating a desired priority to execute the corresponding compute program executable. A compute kernel execution instance may also include an event object identifying a previous execution instance and/or expected total number of threads and number of thread groups to perform the execution. The number of thread groups and total number of threads may be specified in the API calls. In one embodiment, an event object may indicate an execution order relationship between the execution instance that includes the event object and another execution instance identified by the event object. An execution instance including an event object may be required to be executed after another execution instance identified by the event object finishes execution. An event object may be referred to as a queue_after_event_object. In one embodiment, an execution queue may include multiple compute kernel execution instances for executing corresponding compute program executables. One or more compute kernel execution instances for a compute program executable may be scheduled for execution in an execution queue. In one embodiment, the processing logic of process 500 may update the execution queue in response to API requests from an application. The execution queue may be hosted by the hosting data systems where the application is running.

At block 515, the processing logic of process 500 may select a compute kernel execution instance from the execution queue for execution. In one embodiment, the processing logic of process 500 may select more than one compute kernel execution instances to be executed concurrently according to the corresponding logical computing devices. The processing logic of process 500 may determine whether a compute kernel execution instance is selected from the execution queue based on its associated priority and dependency relationships with other execution instances in the execution queue. A compute kernel execution instance may be executed by executing its corresponding compute kernel object according to an executable loaded to the compute kernel object.

At block 517, in one embodiment, the processing logic of process 500 may select one of the plurality of executables loaded to the compute kernel object corresponding to the selected compute kernel instance for execution in a physical computing device associated with the logical computing device for the compute kernel object. The processing logic of process 500 may select more than one executables to be executed in more than one physical computing devices in parallel for one compute kernel execution instance. The selection may be based on current execution statuses of the physical computing devices corresponding to the logical computing device associated with the selected compute kernel execution instance. An execution status of a physical computing device may include the number of threads running, the local memory usage level and the processor usage level (e.g. peak number of operations per unit time) etc. In one embodiment, the selection may be based on predetermined usage levels. In another embodiment, the selection may be based on the number of threads and number of thread groups associated with the compute kernel execution instance. The processing logic of process 500 may retrieve an execution status from a physical computing device. In one embodiment, the processing logic of process 500 may perform operations to select a compute kernel execution instance from the execution queue to execute at blocks 513 and 517 asynchronously to applications running in hosting systems.

At block 519, the processing logic of process 500 may check the execution status of a compute kernel execution instance scheduled for execution in the execution queue. Each execution instance may be identified by a unique compute event object. An event object may be returned to an application or a compute application library, such as application 103 or compute application library 105 of FIG. 5, which calls APIs to execute the execution instance, when the corresponding compute kernel execution instance was queued according to a compute runtime, such as the runtime 109 of FIG. 1. In one embodiment, the processing logic of process 500 may perform the execution status checking in response to API requests from an application. The processing logic of process 500 may determine the completion of executing a compute kernel execution instance by querying a status of the compute event object identifying the compute kernel execution instance. The processing logic of process 500 may wait until the execution of a compute kernel execution instance is complete to return to API calls from an application. The processing logic of process 500 may control processing execution instances reading and/or writing from various streams based on compute event objects.

At block 521, according to one embodiment, the processing logic of process 500 may retrieve results of executing a compute kernel execution instance. Subsequently, the processing logic of process 500 may clean up processing resources allocated for executing the compute kernel execution instance. In one embodiment, the processing logic of process 500 may copy a stream memory holding results of executing a compute kernel executable into a local memory. The processing logic of process 500 may delete variable streams or image streams allocated at block 501. The processing logic of process 500 may delete a kernel event object for detecting when a compute kernel execution is completed. If each compute kernel execution instance associated with a specific compute kernel object has been completely executed, the processing logic of process 500 may delete the specific compute kernel object. In one embodiment, the processing logic of process 500 may perform operations at block 521 based on API requests initiated by an application.

Figure 6:
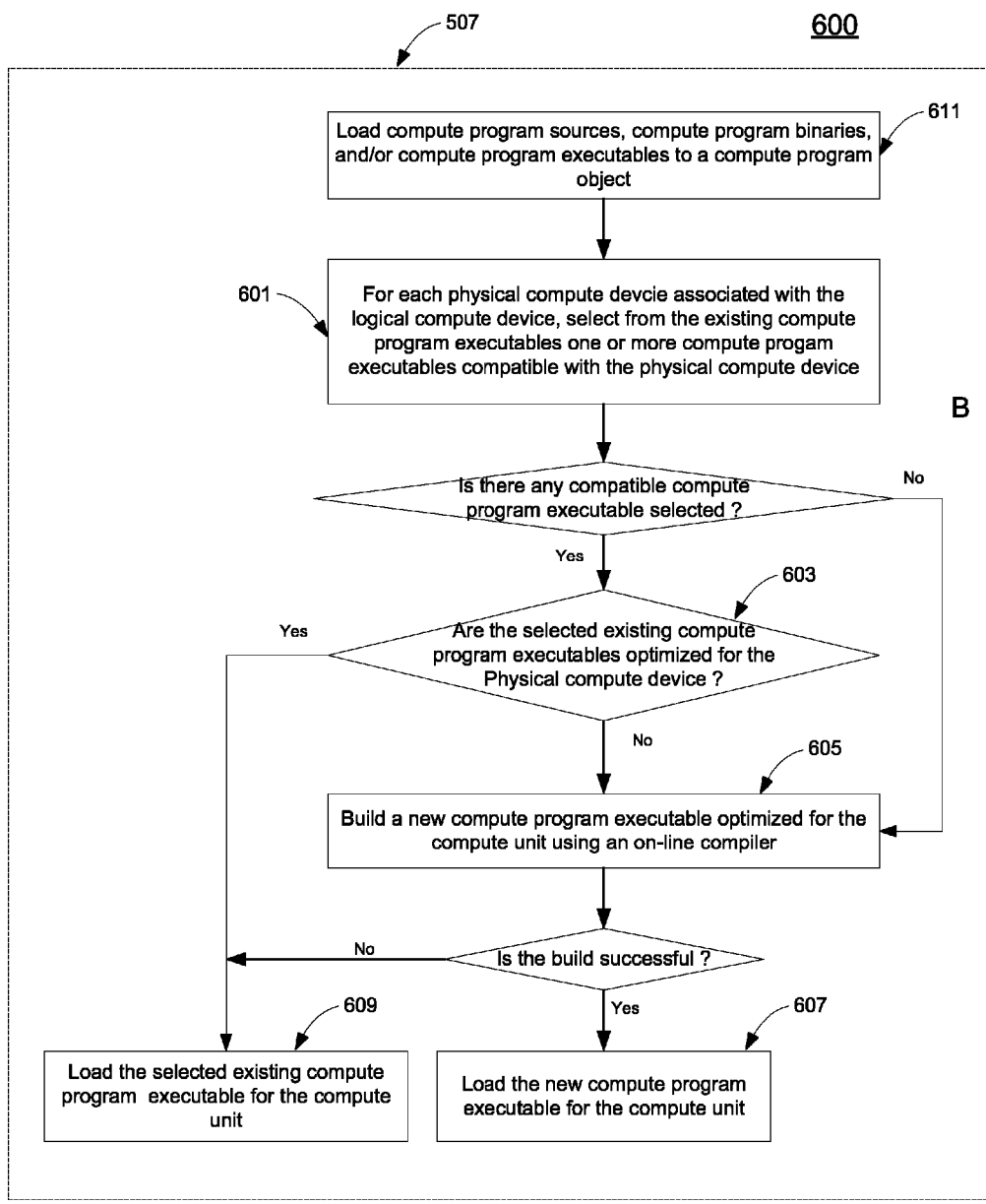
FIG. 6 is a flow diagram illustrating an embodiment of a runtime process to load an executable including compiling a source for one or more physical computing devices determined to execute the executable.

FIG. 6 is a flow diagram illustrating an embodiment of a runtime process 600 to load an executable including compiling a source for one or more physical computing devices determined to execute the executable. Process 600 may be performed as part of process 500 at block 507 of FIG. 5. In one embodiment, process 600 may select, for each physical computing device associated with a logical computing device, one or more existing compute kernel executables compatible with the physical computing device at block 601. A compute kernel executable may be executed in a compatible physical computing device. The existing compute kernel executables may be available from an application or through a compute library such as compute application library 105 of FIG. 1. Each of the selected compute kernel executables may be executed by at least one physical computing device. In one embodiment, the selection may be based on the description data associated with the existing compute kernel executables.

If there are existing compute kernel objects selected, process 600 may determine if any of the selected compute kernel executables is optimized for a physical computing device at block 603. The determination may be based on, for example, the version of the physical computing device. In one embodiment, process 600 may determine that an existing compute kernel executable is optimized for a physical computing device if the version of target physical computing device in the description data matches the version of the physical computing device.

At block 605, in one embodiment, process 600 may build a new compute kernel executable optimized for a physical computing device from the corresponding computer kernel source using an online compiler, such as compute compiler 107 of FIG. 1. Process 600 may perform the online build if none of the selected compute kernel executables are found to be optimized for the physical computing device at block 603. In one embodiment, process 600 may perform the online build if none of existing compute kernel executables are found to be compatible with the physical computing device at block 601. The compute kernel source may be available from an application or through a compute library, such as compute application library 105 of FIG. 1.

If the build at block 605 is successful, in one embodiment, process 600 may load the newly built compute kernel executable into the corresponding compute kernel object at block 607. Otherwise, process 600 may load the selected compute kernel executables to the kernel object at block 609. In one embodiment, process 600 may load a compute kernel executable to a compute kernel object if the compute kernel executable has not yet been loaded. In another embodiment, process 600 may generate an error message if none of existing compute kernel executables for a compute kernel object are compatible with a physical computing device and the corresponding compute kernel source is not available.

Figure 7:
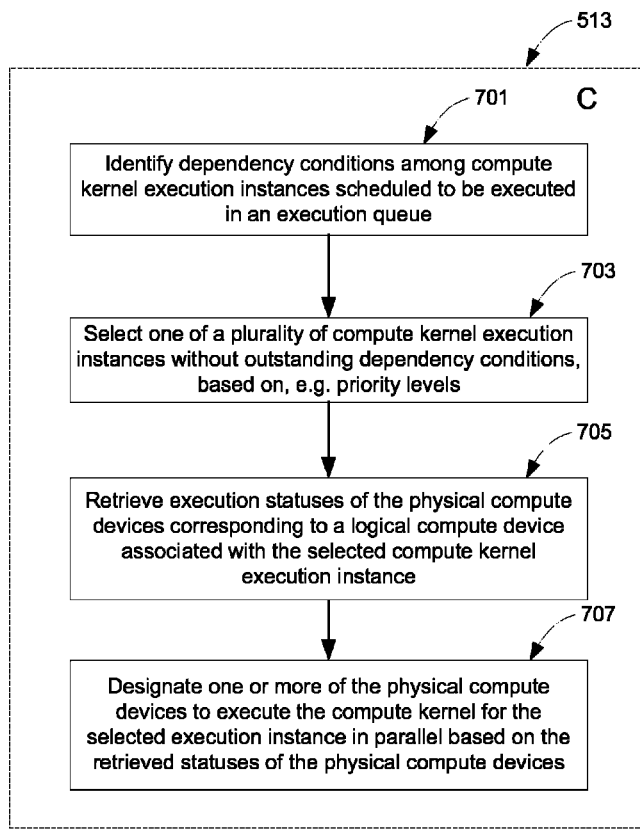
FIG. 7 is a flow diagram illustrating one embodiment of a process to select a compute kernel execution instance from an execution queue to execute in one or more physical compute devices corresponding to a logical computing device associated with the execution instance.

FIG. 7 is a flow diagram illustrating one embodiment of a process 700 to select a compute kernel execution instance from an execution queue to execute in one or more physical computing devices corresponding to a logical computing device associated with the execution instance. Process 700 may be performed as part of process 500 at block 513 of FIG. 5. In one embodiment, process 700 may identify dependency conditions among compute kernel execution instances currently scheduled in an execution queue at block 701. A dependency condition of compute kernel execution instance may prevent execution of a compute kernel execution instance if the condition is outstanding. In one embodiment, a dependency condition may be based on relationships between input streams fed by output streams. In one embodiment, process 700 may detect a dependency condition between execution instances according to input streams and output streams of the corresponding functions for the execution instances. In another embodiment, an execution instance with lower priority level may have a dependency relationship with another execution with high priority level.

At block 703, in one embodiment, process 700 may select a compute kernel execution instances for execution from multiple scheduled compute kernel execution instances without any outstanding dependency condition. The selection may be based on a priority level assigned to an execution instance. In one embodiment, the selected compute kernel execution instance may be associated the highest priority level among the plurality of compute kernel execution instances without outstanding dependency conditions. At block 705, process 700 may retrieve a current execution status for one or more of the physical computing devices corresponding to the selected compute kernel execution instance. In one embodiment, execution status of a physical computing device may be retrieved from predetermined memory locations. In another embodiment, process 700 may send a status request to a physical computing device to receive an execution status report. Process 700 may designate one or more of the physical computing devices to execute the selected compute kernel execution instance based on the retrieved execution statuses at block 707. In one embodiment, a physical computing device may be designated for execution according to a load balancing consideration with other physical computing devices. The selected physical computing device may be associated with an execution status satisfying one or more specified (e.g. predetermined) criteria, such as below a predetermined processor usage level and/or memory usage level. In one embodiment, the predetermined criteria may depend on the number of threads and the number of thread groups associated with the selected compute kernel execution instance. Process 700 may load separate compute kernel executables for the same execution instance or multiple instances to one or more designated physical computing devices to execute in parallel in multiple threads.

Figure 8:
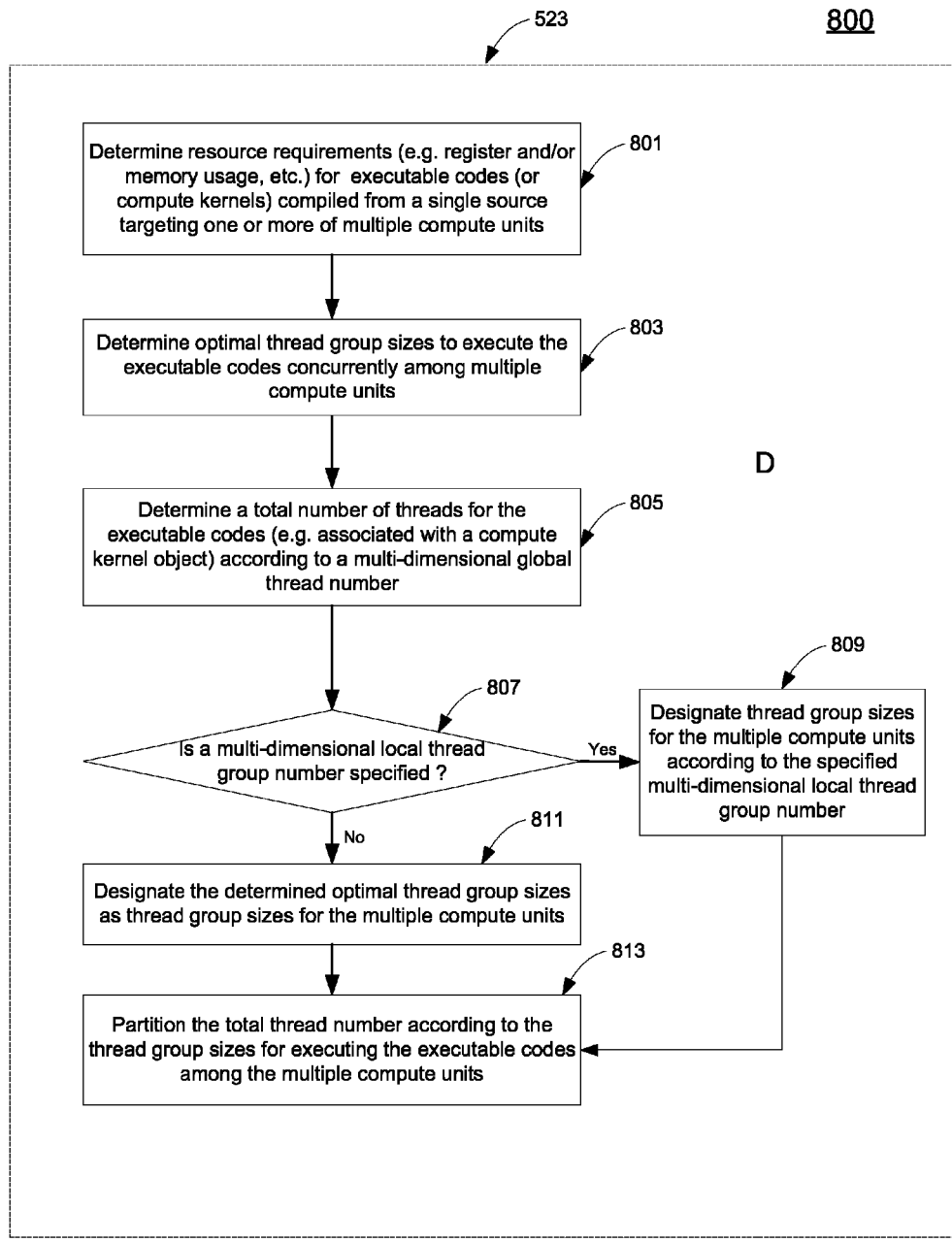
FIG. 8 is a flow diagram illustrating one embodiment of a process to determine optimal thread group sizes to concurrently execute compute kernel objects among multiple compute units.

FIG. 8 is a flow diagram illustrating one embodiment of a process 800 to determine optimal thread group sizes to concurrently execute compute kernel objects among multiple compute units. Exemplary process 800 may be performed by a processing logic that may comprise hardware (circuitry, dedicated logic, etc.), software (such as is run on a dedicated machine), or a combination of both. For example, process 800 may be performed by some components of system 100 of FIG. 1 or as part of process 500 at block 523 of FIG. 5. In one embodiment, at block 801 the processing logic of process 800 may determine resource requirements from executable codes compiled from a single source targeting different compute units. Resource requirements of an executable code may include usage data on registers, memories and/or other hardware components for a target compute unit for the executable code. A single source may be compiled into different executable codes loaded into different types of compute units to perform a data parallel task (or function) specified by the single source. In some embodiments, the processing logic of process 800 may determine resource requirements based on a source code and a target compute unit for executing instructions compiled from the source code.

The processing logic of process 800 may analyze (and/or traverse) an intermediate representation of executable codes compiled from a source code targeting a compute unit to determine required resources to execute the executable codes in the target compute unit. During the analysis, the processing logic of process 800 may identify a portion of a source code based on matching optimization conditions to recompile the identified portion of the source code to reduce the required resources for execution in the target compute unit. For example, the processing logic of process 800 may replace a variable in a source code with a constant value. The processing logic of process 800 may identify a dimension of a data parallel task according to an analysis of the corresponding executable codes. When an identified dimension differs from a dimension specified, for example, using APIs, the processing logic of process 800 may select one of the identified dimension and the specified dimension according to, for example, a system setting.

At block 803, in some embodiment, the processing logic of process 800 may determine optimal thread group sizes for executing executable codes in parallel among multiple compute units according to the determined resource requirements. A group of threads may execute an executable code compiled concurrently in a target compute unit. An optimal thread group size may be the number of threads in a thread group to execute an executable code in a compute unit to maximize resource usage within the compute unit. Resource usage of a compute unit may be measured in terms of the amount of time to accomplish a data parallel task. In some embodiments, the processing logic of process 800 may retrieve current resource usage status from a compute unit to determine an optimal thread group size for an executable code. An optimal thread group size may be based on a dimension associated with the data parallel task for an executable code to perform. A dimension may be a number specifying an iterative computation along more than one measures for a data parallel task. For example, an image processing task may be associated with a dimension of 2 along an image width and an image height.

At block 805, according to one embodiment, the processing logic of process 800 may determine a total number of threads to execute in parallel among multiple compute units one or more executable codes (or compute kernels) compiled from a single source to accomplish a data parallel task (or function). The processing logic of process 800 may receive an API request from an application running in a host processor (or host processing unit), such as applications 103 in hosting systems 101 of FIG. 1. An API request may include a global thread number having a multi-dimensional value as an array of N integers ($G_1, G_2, \ldots, G_N$). Integer N may be a dimension associated with the data parallel task. The processing logic of process 800 may count the number of integers in an array from a multi-dimensional value to determine a dimension. In response to the API request, the processing logic of process 800 may determine the total number of threads that will execute the executable codes among the multiple compute units according to a product of N integers as $G_1 * G_2 * \ldots * G_N$.

In one embodiment, the processing logic of process 800 may verify whether a local thread group number has been specified at block 807. A local thread group number may have a multi-dimensional value specified as an array of N integers ($L_1, L_2, \ldots, L_N$). In one embodiment, the dimension of a local thread group number may be equal to the dimension of a total thread number for performing a data parallel task. The processing logic of process 800 may retrieve a local thread group number from a program kernel object which is associated with a source code and/or an executable code compiled from the source code for a target compute unit. In one embodiment, a local thread group number may be specified using APIs to compile a source code. If a local thread group number can be retrieved, the processing logic of process 800 may verify the local thread group number has already been specified. In some embodiments, a local thread group number may be specified using an API request from an application running in a hosting processor. An API request may include both a multi-dimensional global thread number and a multi-dimensional local thread group number.

At block 809, if a local thread group number has been specified, the processing logic of process 800 may designate a thread group size for a compute unit according the specified local thread group number. In one embodiment, a thread group size corresponding to a local thread group number having a multi-dimensional value ($L_1, L_2, \ldots, L_N$) may be equal to a product of N integers as $L_1 * L_2 * \ldots * L_N$. Executable codes compiled for different compute units may be associated with different local thread group numbers. If a local thread group number has been specified for an executable code, the processing logic of process 800 may designate thread group sizes according to determined optimal thread group sizes for multiple compute units, such as, for example, based on the determination of optimal thread group sizes at block 803.

The processing logic of process 800 may check the designated thread group sizes against allowable thread group sizes during run time for the target compute units. For example, a compute unit may be limited by a maximum runtime thread group size depending on available resources. The processing logic of process 800 may adjust designated thread group sizes to satisfy the runtime resource constraints of targeting computing devices. In some embodiment, the processing logic of process 800 may perform the determination to identify optimal thread group sizes at block 811 when a multi-dimensional local thread group number has not been specified.

At block 813, the processing logic of process 800 may partition the total number of threads according to thread group sizes to execute concurrently in multiple compute units for a data parallel task. An executable code may execute in parallel in a compute unit as a group of threads having a size equal to the corresponding thread group size. The size of a group of threads may be the number of threads in the group. The processing logic of process 800 may decompose a data parallel task into appropriate multi-dimensional blocks or thread groups that can be executed concurrently across one or more compute units.

In one embodiment, a thread that executes an executable code may be identified by two distinct thread variables, a global thread ID (identifier) and a local thread ID. A global thread ID may be specified with a multi-dimensional value starting at $(0, 0, \ldots, 0)$ and goes to $(G_1-1, G_2-1, \ldots, G_N-1)$ based on a global thread number $(G_1, G_2, \ldots, G_N)$. Similarly, a local thread ID may be specified with a multi-dimensional value starting at $(0, 0, \ldots, 0)$ and goes to $(L_1-1, L_2-1, \ldots, L_N-1)$ based on a local thread group number $(L_1, L_2, \ldots, L_N)$. A global thread ID and a local thread ID for a thread may be multi-dimensional values of the same dimension.

Figures 9A, 9B:
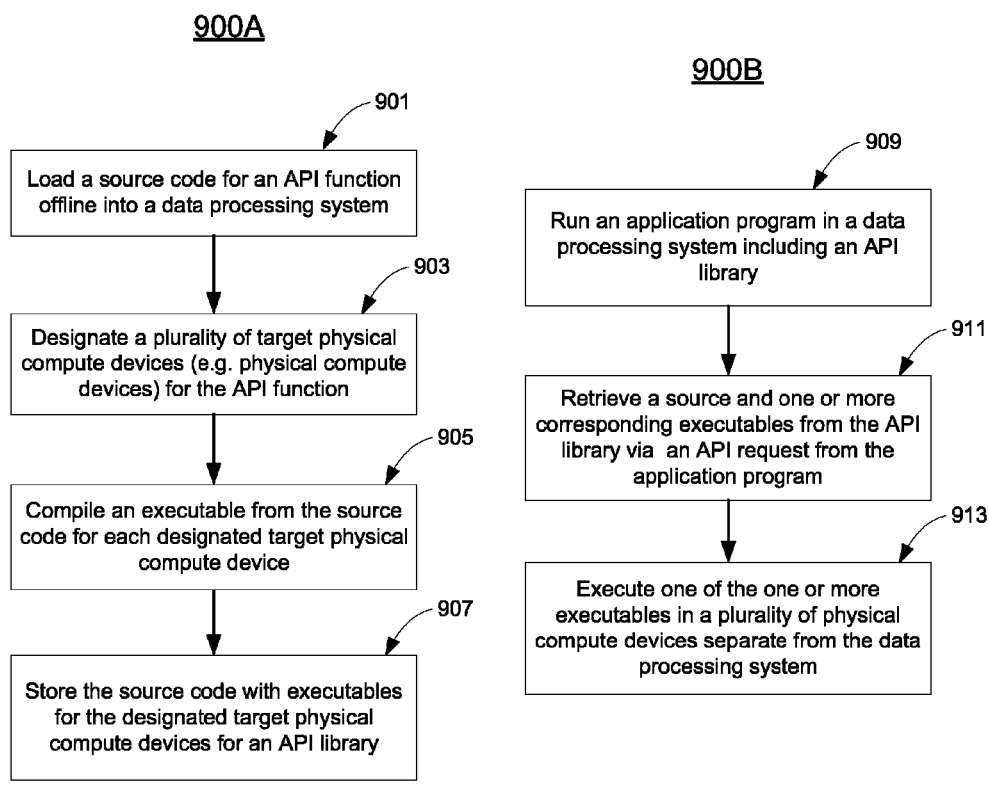
FIG. 9A is a flow diagram illustrating one embodiment of a process to build an API (Application Programming Interface) library storing a source and a plurality of executables for one or more APIs in the library according to a plurality of physical computing devices.
FIG. 9B is a flow diagram illustrating one embodiment of a process for an application to execute one of a plurality of executables together with a corresponding source retrieved from an API library based on API requests.

FIG. 9A is a flow diagram illustrating one embodiment of a process 900A to build an API library storing a source and multiple executables for one or more APIs in the library according to multiple physical computing devices. Process 900A may be performed offline to load a source code for an API function into a data processing system at block 901. The source code may be a compute kernel source to be executed in one or more physical computing devices. In one embodiment, process 900A may designate multiple target physical computing devices for the API function at block 903. A target physical computing device may be designated according to types, such as CPU or GPU, versions or vendors. Process 900A may compile the source code into an executable, such as a compute kernel executable, for each designated target physical computing device at block 905. In one embodiment, process 900A may perform the compilation offline based on an online compiler, such as compute compiler 107 of FIG. 1.

At block 907, process 900A may store the source code of the API function into an API library with corresponding executables compiled for the designated target physical computing devices. One or more API functions for a single executable may be exported from an API library to accommodate source codes of host applications, such as applications 103 of FIG. 1, running in a host processor. For example, an application may execute executable codes (or compute kernel) using OpenCL API as a regular "C" function call. In one embodiment, each executable may be stored with description data including, for example, the type, version and vendor of the target physical computing device and/or compilation options. The description data may be retrieved by a process during run time, such as process 500 of FIG. 5.

FIG. 9B is a flow diagram illustrating one embodiment of a process 900B for an application to execute one of multiple executables together with a corresponding source retrieved from an API library based on an API request. In one embodiment, process 900B runs an application program, such as application 103 of FIG. 1, in a data processing system, such as in hosting systems 101 of FIG. 1, including an API library, such as compute application library 105 of FIG. 1. At block 911, process 900B may retrieve a source, such as compute kernel source, and one or more corresponding executables, such as compute kernel executables, from the API library based on API requests, such as process 500 at block 507 of FIG. 5. Each executable may be associated with one or more target physical computing devices. In one embodiment, a compute kernel executable may be backward compatible with multiple versions of physical computing devices. At block 913, process 900B may execute one of the retrieved executables based on an API request in multiple physical computing devices to perform the associated API function, such as process 500 at block 517 of FIG. 5. Process 900B may run the application at block 909 asynchronously to performing an API function at block 913.

FIG. 10 is sample source code illustrating an example of a compute program source code for a compute program executable to be executed in multiple physical computing devices. Example 1000 may represent an API function with arguments including variables 1001 and streams (or compute memory objects) 1003. Example 1000 may be based on a programming language for a parallel computing environment such as system 101 of FIG. 1. In one embodiment, the parallel programming language may be specified according to ANSI (American National Standards Institute) C standard with additional extensions and restrictions designed to implement one or more of the embodiments described herein. The extensions may include a function qualifier, such as qualifier 1005, to specify a compute kernel function to be executed in a computing device. A compute kernel function may not be called by other compute kernel functions. In one embodiment, a compute kernel function may be called by a host function in the parallel program language. A host function may be a regular ANSI C function. A host function may be executed in a host processor separate from the computing device executing a compute kernel function. In one embodiment, the extensions may include a local qualifier to describe variables that need to be allocated in a local memory associated with a computing device to be shared by all threads of a thread group. The local qualifier may be declared inside a compute kernel function. Restrictions of the parallel programming language may be enforced during compiler time or run time to generate error conditions, such as outputting error messages or exiting an execution, when the restrictions are violated.

FIGS. 11A-11C include a sample source code illustrating an example to configure a logical computing device for executing one of multiple executables in multiple physical computing devices by calling APIs. Examples 1100A-1100C may be executed by an application running in a host system attached with multiple physical computing devices, such as hosting systems 101 of FIG. 1. Examples 1100A-1100C may specify a host function of a parallel programming language. Processing operations in examples 1100A-1100C may be performed as API calls by a process such as process 400 of FIG. 4 and/or process 500 of FIG. 5. Processing operations to create a context object from a computing device, a computing device group or a logical computing device 1101 may be performed by the processing logic of process 400 at block 411 of FIG. 4. Processing operations to allocate input/output image memory objects (e.g. compute memory objects) 1103*a* may be performed by the processing logic of process 500 at block 501 of FIG. 1.

Turning now to FIG. 11B, processing operations to allocate and load array memory objects 1103*b* may be performed by the processing logic of process 500 at block 501 of FIG. 5. The processing operation to create a compute program object 1105 may be performed by the processing logic of process 500 at block 503 of FIG. 5. Processing operation 1107 may load a compute program source, such as example 900 of FIG. 9, to the compute program object created. Processing operation 1109 may explicitly build a compute program executable from the loaded compute program source. In one embodiment, processing operation 1109 may load an already built compute program executable to the created compute program object. Subsequently, processing operation 1111 may create a compute kernel object pointing to the built compute program executable for scheduling an execution on a computing device.

Turning now to FIG. 11C, in one embodiment, processing operation 1113 may attach variables and compute memory objects as function arguments for the created compute kernel object. Processing operation 1113 may be performed by the processing logic of process 500 at block 505 of FIG. 5. Processing operation 1115 may execute the created compute kernel object. In one embodiment, processing operation 1115 may be performed by the processing logic of process 500 at block 511 of FIG. 5. Processing operation 1115 may cause an execution queue to be updated with a compute kernel execution instance corresponding to the created compute kernel object. Processing operation 1117 may synchronously wait for a completion of executing the create compute kernel object. In one embodiment, processing operation 1119 may retrieve a result from executing the compute kernel object. Subsequently, processing operations 1121 may clean up allocated resources for executing the compute kernel object, such as an event object, the created compute kernel object and the allocated memories. In one embodiment, processing operation 1117 may be performed asynchronously based on whether a kernel event object is set. Processing operation 1117 may be performed by process 500 at block 519 of FIG. 5.

Figure 12:
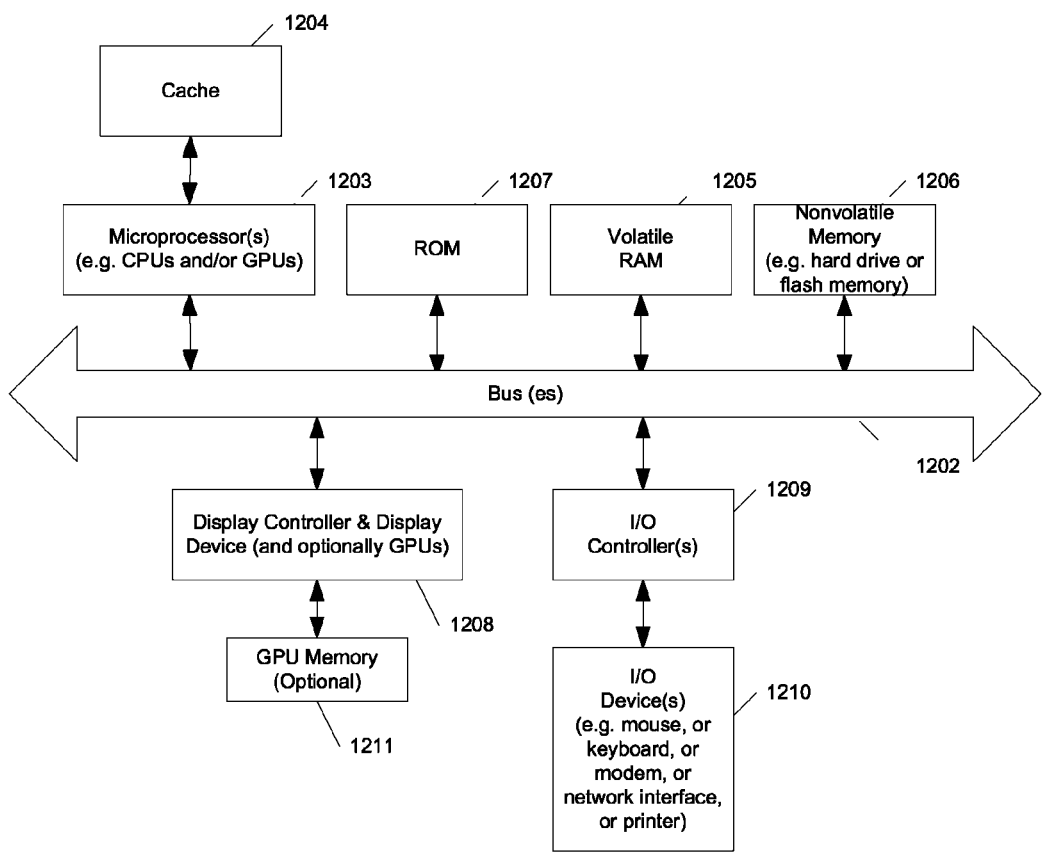
FIG. 12 illustrates one example of a typical computer system with a plurality of CPUs and GPUs (Graphical Processing Unit) that can be used in conjunction with the embodiments described herein.

FIG. 12 shows one example of a computer system 1200 that can be used with one embodiment the present invention. For example, the system 1200 may be implemented as a part of the systems shown in FIG. 1. Note that while FIG. 12 illustrates various components of a computer system, it is not intended to represent any particular architecture or manner of interconnecting the components as such details are not germane to the present invention. It will also be appreciated that network computers and other data processing systems (for example, handheld computers, personal digital assistants (PDAs), cellular telephones, entertainment systems, consumer electronic devices, etc.) which have fewer components or perhaps more components may also be used with to implement one or more embodiments of the present invention.

As shown in FIG. 12, the computer system 1200, which is a form of a data processing system, includes a bus 1202 which is coupled to a microprocessor(s) 1203, such as CPUs and/or GPUs, a ROM (Read Only Memory) 1207, volatile RAM 1205 and a non-volatile memory 1206. The microprocessor 1203 may retrieve the instructions from the memories 1207, 1205, 1206 and execute the instructions using Cache 1204 to perform operations described above. The bus 1202 interconnects these various components together and also interconnects these components 1203, 1207, 1205, and 1206 to a display controller and display device 1208 and to peripheral devices such as input/output (I/O) devices which may be mice, keyboards, modems, network interfaces, printers and other devices which are well known in the art. Typically, the input/output devices 1210 are coupled to the system through input/output controllers 1209. The volatile RAM (Random Access Memory) 1209 is typically implemented as dynamic RAM (DRAM) which requires power continually in order to refresh or maintain the data in the memory. The display controller coupled with a display device 1208 may optionally include one or more GPUs to process display data. Optionally, GPU memory 1211 may be provided to support GPUs included in the display device 1208.

The mass storage 1211 is typically a magnetic hard drive or a magnetic optical drive or an optical drive or a DVD RAM or a flash memory or other types of memory systems which maintain data (e.g. large amounts of data) even after power is removed from the system. Typically, the mass storage 1206 will also be a random access memory although this is not required. While FIG. 12 shows that the mass storage 1206 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1202 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code, for example, including multiple tokens. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., using a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A parallel computing system comprising:
  a host processor;
  one or more compute units coupled to the host processor;
  a memory coupled to at least one of the host processor and the one or more compute units, wherein a parallel computing program is stored in the memory, wherein the parallel computing program is executable by the host processor, the parallel computing program specifying a source code and processing requirements for a data processing task based on the source code, wherein the source code is not yet compiled before runtime when the parallel computing program is executed, the parallel computing program including calls to one or more APIs (application programming interface) for the host processor to perform during the runtime of the parallel computing program:
    selecting the compute units based on the processing requirements which include a multi-dimensional value specifying a number of threads to perform the data processing task, at least one of the APIs is called with the processing requirements;
    generating executable codes from the source code for the one or more compute units, at least one of the APIs is called with a specification of the source code; and loading the executable codes to be executed concurrently via the number of threads among the one or more compute units to perform the data processing task.

2. The system of claim 1, further comprising:
generating a program object corresponding to the source code, wherein the program object includes a binary code compiled from the source code, wherein the binary code includes descriptions of at least one of the one or more compute units.

3. The system of claim 2, wherein the generation of the program object comprises:
retrieving the binary code from a precompiled library, wherein the binary codes include the executable codes.

4. The system of claim 2, wherein the generation of the executable codes comprises:
compiling the source code into the binary code according to one or more compilation flags including the multi-dimensional value for executing one of the executable codes in at least one of the one or more compute units.

5. The system of claim 1, wherein the one or more compute units include one or more graphics processing units (GPUs).

6. The system of claim 1, wherein the one or more compute units include one or more central processing units (CPUs).

7. A parallel computing system comprising a host processor;
one or more compute units coupled to the host processor;
a memory coupled to at least one of the host processor and the one or more compute units, wherein a parallel computing program is stored in the memory, the parallel computing program specifying a source code and processing requirements for a data processing task based on the source code, the parallel computing program including calls to one or more APIs (application programming interface) for the host processor to perform:
selecting the compute units based on the processing requirements which include a multi-dimensional value specifying a number of threads to perform the data processing task, at least one of the APIs is called with the processing requirements;
generating executable codes from the source code for the one or more compute units, at least one of the APIs is called with a specification of the source code;
loading the executable codes to be executed concurrently among the one or more compute units to perform the data processing task, wherein the loading of the executable codes comprises:
generating a kernel object associated with a function name identifying a function implementing the data processing task in the source codes, the kernel object including storage for arguments of the function, and
scheduling execution of the executable codes among the one or more compute units, wherein the execution including the number of threads in a thread group to execute one of the executable codes concurrently in at least one of the one or more compute units.

8. The system of claim 7, wherein the loading of the executable codes further comprises:
allocating one or more memory objects in the memory corresponding the storages of the arguments.

9. The system of claim 7, wherein the scheduling comprises:
determining a total number of threads to execute the executable codes in parallel in the one or more compute units.

10. The system of claim 9, wherein the determining comprises:
analyzing the binary code to determine a resource requirement for the function to perform the data processing task.

11. The system of claim 10, wherein the determining further comprises:
determining the number of threads in the thread group according to a runtime resource availability of the at least one of the one or more compute units.

12. The system of claim 7, wherein the loading further comprises:
retrieving the number of threads in the thread group in response to one or more of the calls to the one or more APIs.

13. A machine readable non-transitory storage medium storing a plurality of tokens comprising:
host function tokens associated with function parameters, the function parameters specifying a source code and processing requirements for a data processing task based on the source code, wherein the host function tokens including executable code, wherein the source code is not yet compiled before runtime of the executable code for the host function tokens, the host function tokens corresponding to one or more APIs (application programming interfaces) for a host processor to perform, during the runtime of the executable code, one or more host functions including:
selecting one or more compute units coupled to the host processor based on the processing requirements, wherein the processing requirements include a multi-dimensional value specifying a number of threads to perform the data processing task, at least one of the APIs is called with the processing requirements,
generating executable codes from the source code for the one or more compute units selected, at least one of the APIs is called with a specification of the source code, and
loading the executable codes to be executed concurrently among the one or more compute units to perform the data processing task via the number of threads, and
kernel function tokens corresponding to the source code for the data processing task.

14. The machine-readable medium of claim 13, wherein the host functions further including:
generating a program object corresponding to the source code for the data processing task, wherein the program object includes a binary code compiled from the source code, wherein the binary code includes descriptions of at least one of the one or more compute units.

15. The machine-readable medium of claim 14, wherein generating the program object comprises:
retrieving the binary code from a precompiled library, wherein the binary codes include the executable codes.

16. The machine-readable medium of claim 14, wherein generating the executable codes comprises:
compiling the source code into the binary code according to one or more compilation flags including the multi-dimensional value to specify number of threads for executing one of the executable codes in at least one of the one or more compute units.

17. The machine-readable medium of claim 13, wherein the loading of the executable codes comprises:
generating a kernel object associated with a function name identifying a function implementing the data processing task in the source codes, the kernel object including storages for arguments of the function; and scheduling execution of the executable codes among the one or more compute units, wherein the scheduling including number of threads in a thread group to execute one of the executable codes concurrently in at least one of the one or more compute units.

18. The machine-readable medium of claim 17, wherein the loading of the executable codes further comprises:

allocating one or more memory objects in the memory for the storages of the arguments.

19. The machine-readable medium of claim 17, wherein the scheduling comprises:

determining a total number of threads to execute the executable codes in parallel in the one or more compute units.

20. The machine-readable medium of claim 19, wherein the determining comprises:

analyzing the binary code to determine a resource requirement for the function to perform the data processing task.

21. The machine-readable medium of claim 20, wherein the determining further comprises:

determining the number of threads in the thread group according to a runtime resource availability of the at least one of the one or more compute units.

22. The machine-readable medium of claim 17, further comprising:

generating an event object including a status value indicating whether the scheduled execution has been completed; and retrieving the status value for the parallel computing program in response to the one or more of the calls to the one or more APIs.

23. The machine-readable medium of claim 13, wherein the one or more compute units include one or more GPUs.

24. The machine-readable medium of claim 13, wherein the one or more compute units include one or more CPUs.

* * * * *